United States Patent Office 3,443,965
Patented May 13, 1969

3,443,965
EMULSIFIER FOR USE IN MAKING YEAST-RAISED BAKED GOODS
Hermann Birnbaum, Pittsburgh, Pa., assignor to Star-Kist Foods, Inc., McKees Rocks, Pa., a corporation of California
No Drawing. Filed Apr. 5, 1966, Ser. No. 540,207
Int. Cl. A21d 2/16
U.S. Cl. 99—91                                 5 Claims

ABSTRACT OF THE DISCLOSURE

There is disclosed an additive for use in baking yeast raised products combining monoglycerides of fat-forming fatty acids having a low iodine value with monoglycerides of fat-forming fatty acids of high iodine value in combination with diacetyl tartaric acid ester of mono and diglycerides of edible vegetable oils of commerce.

---

This invention is for the making of baked goods and a preparation for use in the commercial production of yeast-raised bakery products, and particularly for a preparation known to the baking industry as an emulsifier.

Emulsifiers as used in baking are intended primarily to improve the texture and crumb of bread and to retard staling of the bread and enable it to remain soft for a greater length of time. A widely used product for this purpose is a monoglyceride of a fat-forming fatty acid, usually one that is a solid at room temperature, and which has a low iodine number indicating that it has a low degree of unsaturation.

The monoglyceride of a highly or fully-saturated fatty acid so used is effective only with the amylose fraction of the starch.

Monoglycerides of highly unsaturated fatty acids, such as those derived from the vegetable oils of commerce, are not used because they have a selective preference for the protein of the flour, with which, however, they form only a weak attachment. This not only makes the dough sticky, and therefore difficult to handle in production equipment, but impairs the strength of the dough and results in a bread with poor texture.

With the increasing use of continuous bread making where the emulsifier is introduced into the "brew," the monoglyceride of a highly saturated fatty acid, i.e., one having a low iodine number, can be used only to a limited extent, because of the excessive foaming action that results. Moreover, the walls of the resulting loaf may be so soft as to be easily broken, mashed, or otherwise damaged when the bread is removed from the pans, wrapped, or the wrapped loaves stacked. Monoglyceride of highly unsaturated fatty acids, i.e., those having a high iodine number, have an opposite effect; they tend to reduce foaming.

According to the present invention there is used as an emulsifier both types of monoglycerides, or mono and diglycerides are combined along with diacetyl tartaric acid ester of monoglyceride, or of mono and diglyceride (TEM) derived from a highly unsaturated vegetable oil of commerce.

The physical chemistry involved in the use of this combination of ingredients is complicated and need not be fully discussed here, but one important effect results from the fact that monoglyceride of unsaturated fatty acid is non-ionic, while the protein in flour is low in basic amino acids, but high in amides, so that any attachment of the unsaturated monoglyceride with flour protein is weak. However, because of the carboxyl group in TEM it is anionic, and for this reason will bring about an environment where a relatively stronger bond is effected between the monoglyceride and the flour protein.

With the present invention there is sufficient hard monoglyceride, i.e., monoglyceride of a low iodine number, to combine with the amylose fraction of the starch to produce good anti-stalling characteristics; there is monoglyceride or mono and diglyceride to combine with the flour protein, and there is diacetyl tartaric acid ester derived from mono and diglycerides of unsaturated fatty acids to establish an environment such as to effect bonding of the unsaturates with the flour protein. The resulting dough, instead of being sticky, is dry to the touch and has good panning qualities. The texture is good, and contrary to what would be expected, the walls of the loaf are firmer than when only monoglyceride of highly saturated fatty acid is used as the emulsifier.

While the use of TEM either alone or with monoglyceride as an emulsifier is presently known to the industry, the monoglyceride when used with TEM is the monoglyceride of a fat-forming fatty acid which is highly saturated, and the TEM so used may be likewise derived from the re-esterification of the monoglyceride of a saturated fatty acid.

The TEM used with the present invention may be produced either from the concentrated type of monoglyceride derived from molecular distillation in which the monoglyceride comprises 90% or more, with the remainder being principally diglyceride, or it may be of the less expensive commercial type comprising around 60% monoglyceride with the remainder diglyceride and triglyceride. This is true also of the monoglyceride of both types used in the formulae. Excluding the TEM, however, the two monoglyceride components of the mix are preferably distilled monoglycerides because they have higher melting points than the commercial type, and in continuous mix operations especially, low melting point monoglycerides, similarly to low melting point shortening, may be responsible for inferior results, i.e., lower loaf volume, poorer grain structure, and less softness in the bread.

The vegetable oils that are used in the manufacture of TEM for the present invention are the usual edible vegetable oils of commerce, these being olive oil, peanut oil, cottonseed oil, corn oil and soybean oil. They are here listed in order according to ascending iodine values, and they may be used separately or in various mixtures or combinations.

The more fully saturated monoglyceride that provides the principal anti-stalling quality to the mixture will practically always be a concentrated monoglyceride obtained by molecular distillation, and is generally, but not necessarily, derived from animal fat or hydrogenation of unsaturated fatty acid.

The following are typical examples of emulsifiers prepared in accordance with this invention, but it should be noted that the amounts are approximate and the invention may be practiced by the selection of ingredients giving a broad spectrum of iodine values in order to provide monoglycerides of iodine values to combine with the amylose fraction of the starch and monoglycerides of relatively high iodine values to combine with the protein and diacetyl tartaric acid esters of mono and diglyceride derived from unsaturated oils.

EXAMPLE I

Emulsifying ingredients are combined as follows:

30% distilled monoglyceride derived from beef tallow having an iodine value of about 40
30% of distilled monoglyceride derived from soybean oil having an iodine value of about 100
40% diacetyl tartaric ester of mono and diglycerides derived from soybean oil.

EXAMPLE II

Emulsifying ingredients are combined as follows:

15% of saturated distilled monoglyceride derived from either fully hydrogenated vegetable oil or meat fat, and having an iodine value not substantially exceeding 5

45% of monoglyceride derived from soybean oil having an iodine value of about 100

40% of diacetyl tartaric acid ester of mono and diglycerides from a vegetable oil of commerce or combinations thereof.

EXAMPLE III

The following emulsifying ingredients are used:

15% of a monoglyceride having an iodine value of about 60 which is derived from a hydrogenated vegetable shortening with an original iodine value of about 75

40% of soybean oil monoglyceride

40% of diacetyl tartaric acid esters of monoglycerides obtained from vegetable oil.

EXAMPLE IV

A mixture is prepared comprising the following emulsifying ingredients:

30% monoglyceride having an iodine value of about 50 derived from lard

30% monoglyceride having an iodine value of about 85 derived from cottonseed oil 40% diacetyl tartaric acid ester of mono and diglycerides of a commercial vegetable oil.

In the foregoing examples the percentages are approximate and not precisely critical, but in all of them there are three types of fat-derived compounds, i.e., monoglyceride of a fatty acid of relatively low iodine value, monoglyceride or mono and diglyceride of a fatty acid of relatively high iodine value, and diacetyl tartaric acid ester of monoglyceride or mono and diglyceride derived from vegetable oil and which has a relatively high iodine number. In all of them the percentage of diacetyl tartaric acid ester derived from vegetable oil is less than the combined hard and soft monoglycerides, but higher than the percentage of the monoglyceride derived from the more saturated fatty acid. In all of them the emulsifier has a broad spectrum of iodine values indicative of the presence of saturated or nearly saturated and highly unsaturated monoglycerides.

The mixture is prepared by combining and mixing the ingredients when they are in a melted or semi-melted condition, and upon cooling to room temperature, it is a plastic of the consistency of hydrogenated vegetable oil shortening or lard. One commercial preparation comprises 35% diacetyl tartaric acid esters of mono and diglycerides, and 50% concentrated monoglycerides divided about equally between monoglycerides derived from highly unsaturated vegetable oils and monoglyceride derived from highly saturated animal fat (Example I). This is combined with about 15% of triglyceride from animal or vegetable sources to give a good plastic consistency. It is in the ratio of 85 parts of combined monoglycerides and TEM with 15 parts of fat, such as lard, or vegetable shortening or mixtures thereof. Small amounts of commonly used anti-oxidants are usually included.

In use in commercial bakeries, it is suggested that about 1 oz. of emulsifier be used to each 7½ ozs. of shortening. For each 100 lbs. of flour, a recommended formula may be 3 lbs. 11 ozs. of shortening, and 8 ozs. of the emulsifier above described. Or another formula may provide that with each 100 lbs. of flour there be 2 lbs. 13 ozs. of shortening. In this case 6 ozs. of the emulsifier will be used. In all cases, regulations of the Federal Department of Health, Education and Welfare impose restrictions on the total combined percentages of emulsifiers, and the present invention is effective within these restrictions.

In the making of bread by the batch process, the emulsifier may be added either in the sponge or in the dough.

In the continuous mix process this emulsifier is especially advantageous. When the emulsifier is added to the brew which contains 15% or more of the total flour, there is a definite improvement in the viscosity of the brew. It passes more readily and uniformly through the lines, and the lines remain cleaner, due to the complete dispersion of the brew ingredients and the superior emulsifying action. It is therefore preferably added to the brew stage, particularly when 15% or more of the flour is used in the brew. This is accomplished by heating the emulsifier over a low heat and adding the clear melt only after the flour has been added. If less than 15% of the total flour is used in the brew, the emulsifier may be introduced into the brew several minutes before the flour is added. Addition of the flour immediately after the introduction of the unmelted emulsifier will result in excessive foaming.

However, if the baker chooses, he may melt the shortening and flakes (used where the lard is otherwise too soft) and then add the emulsifier after the temperature is lowered. With this procedure the emulsifier is of course introduced with the shortening.

With the emulsifier of the present invention, more water may be used than with the usual monoglyceride emulsifier. The increase may vary between ½ and 1½% over the amount which may be used with the regular monoglyceride emulsifier. When the dough is panned, and with the increased water, the dough is softer, but it actually feels drier, indicative of the more effective emulsifying action, and perhaps is also indicative of some other physical phenomenon not presently understood. A softer dough gives better "pan flow," thereby giving the baked loaf a good shape and better appearance. Also, with good pan flow, the bread raises more evenly. Surprisingly, this softness of the dough is obtained without sacrifice of the strength of the dough structure.

Normal fermentation and proofing schedules are followed, but it has been observed that the bread using this emulsifier raises higher under the same proofing procedure. The bread after baking maintains its shape in depanning and wrapping and has excellent texture and palatability, whereas some conditioners that improve the loaf actually impair flavor. The bread has noticeably better sidewall strength, better slicing qualities, and superior shelf life than bread made with monoglyceride alone. Even Pullman loaves, which ordinarily sag across the top, maintain their square shape when this emulsifier is used.

The same improved qualities are imparted to rolls by the emulsifier. Because the emulsifier of this invention favorably modifies the gluten, it is especially useful in rolls and variety breads where gluten strength is a "must."

While it is desirable to prepare the emulsifier by combining the ingredients for easy incorporation into the other constituents of the bread in proper proportions, it is within the contemplation of my invention that they be separately incorporated where this is feasible.

I claim:

1. An emulsifier for use in the making of yeast-raised baked goods comprising essentially about
    15% to 30% of a monoglyceride derived from a saturated fatty acid having an iodine value in the range of 0 to a maximum of about 60,
    30% to 45% of monoglyceride derived from an unsaturated fatty acid having an iodine value in the range of 60 to at least 100,
    the total of both of said monoglycerides not exceeding about 60%, and
    the remainder being diacetyl tartaric acid ester of mono- and diglycerides derived from unsaturated edible vegetable oil of commerce.

2. An emulsifier as defined in claim 1 in which said ingredients are combined with fat in the ratio 85 parts of said ingredients to 15 parts of fat.

3. An emulsifier as defined in claim 1 in which the monoglycerides of low iodine value and high iodine values are concentrated products resulting from molecular distillation.

4. An emulsifier for use in making yeast-raised baked goods as defined in claim 1 in which the first-named monoglyceride present in the amount of about 30% is derived from beef tallow having an iodine value of about 40, the second-named monoglyceride present in the amount of about 30% is derived from soybean oil having an iodine value of about 100 and the diacetyl tartaric acid ester is also derived from soybean oil.

5. An emulsifier for use in making yeast-raised baked goods as defined in claim 1 in which there is about 15% of distilled monoglyceride derived from a fat selected from the group consisting of animal fat and fully hydrogenated vegetable oil with an iodine value not substantially exceeding 5, 45% of distilled monoglyceride derived from soybean oil having an iodine value of about 100, and 40% of diacetyl tartaric acid of mono- and diglycerides derived from vegetable oil of commerce.

References Cited
UNITED STATES PATENTS 2,689,797  9/1954  Joffe _____ 99—91
3,216,829  11/1965  Hansen _____ 99—118

LIONEL M. SHAPIRO, *Primary Examiner.*

U.S. Cl. X.R.

99—90, 118